United States Patent [19]
Fleming

[11] 3,909,978
[45] Oct. 7, 1975

[54] METHOD AND APPARATUS FOR GROWING PLANTS

[76] Inventor: Margaret M. Fleming, 1933 Olive Ave., P.O. Box 1005, Fremont, Calif. 94538

[22] Filed: June 13, 1974

[21] Appl. No.: 478,911

[52] U.S. Cl. .................................. 47/1.2; 47/17
[51] Int. Cl.² ........................................ A01G 31/00
[58] Field of Search ...................... 47/39, 17, 1.2

[56] References Cited
UNITED STATES PATENTS

| | | | |
|---|---|---|---|
| 2,244,677 | 6/1941 | Cornell | 47/1.2 UX |
| 3,254,448 | 6/1966 | Ruthner | 47/1.2 |
| 3,432,965 | 3/1969 | Smith et al. | 47/1.2 |
| 3,529,379 | 9/1970 | Ware | 47/17 |

Primary Examiner—Stephen G. Pellegrino
Attorney, Agent, or Firm—Owen, Wickersham & Erickson

[57] ABSTRACT

A method for growing plants from seeds or small seedlings wherein the latter are first planted in open tray-like containers that are secured to an elongated rotatable module or core support about its longitudinal axis of rotation. The core support with its containers is moved at a slow speed through a controlled, growth enhancing environment as it also rotates at a constant rate. An apparatus for accomplishing the method comprises a continuous chain means driven by a first drive means at a constant rate and to which are attached a series of module supports that are simultaneously rotated by a second drive means as they are moved along through a controlled environment. Each module support provides a mounting frame for retaining a plurality of removable plant containers or trays for growing plants or seedlings.

14 Claims, 10 Drawing Figures

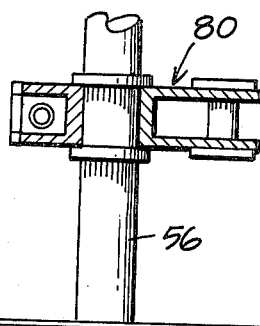
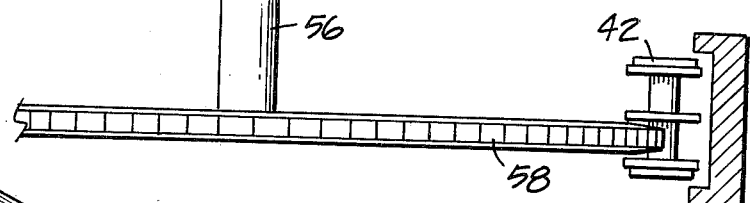
FIG. 4.
FIG. 8.
FIG. 3.
FIG. 9.
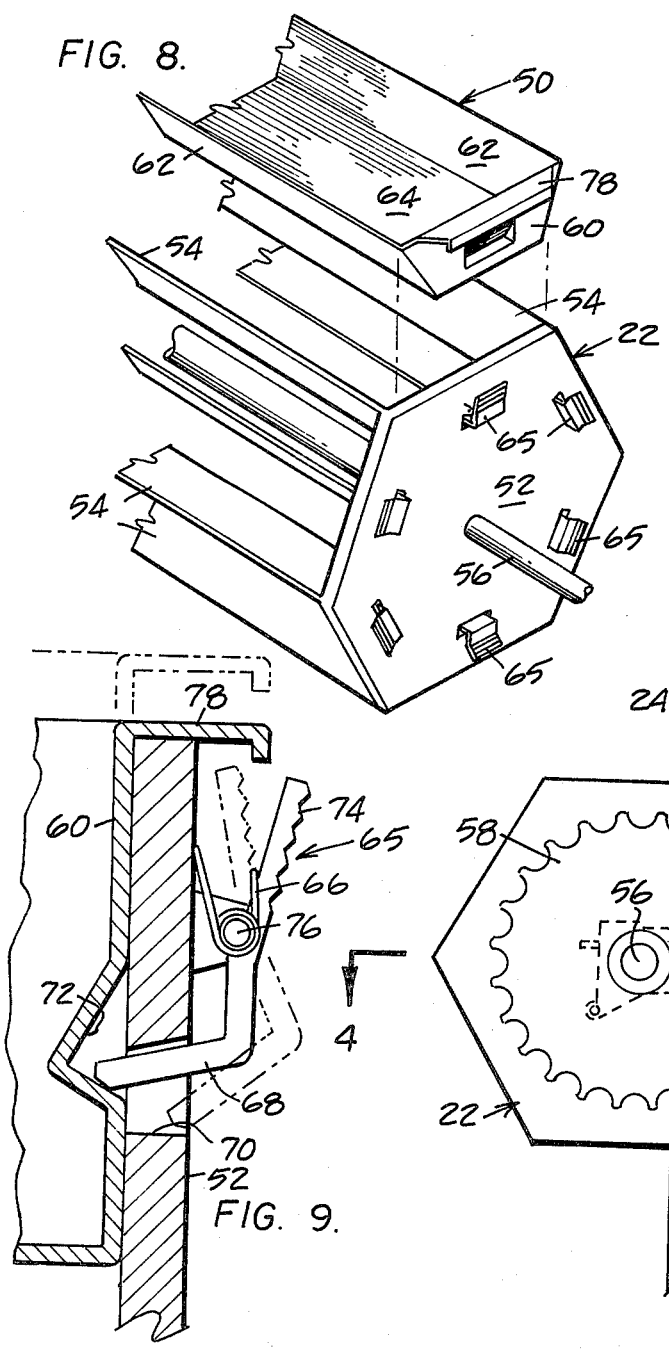
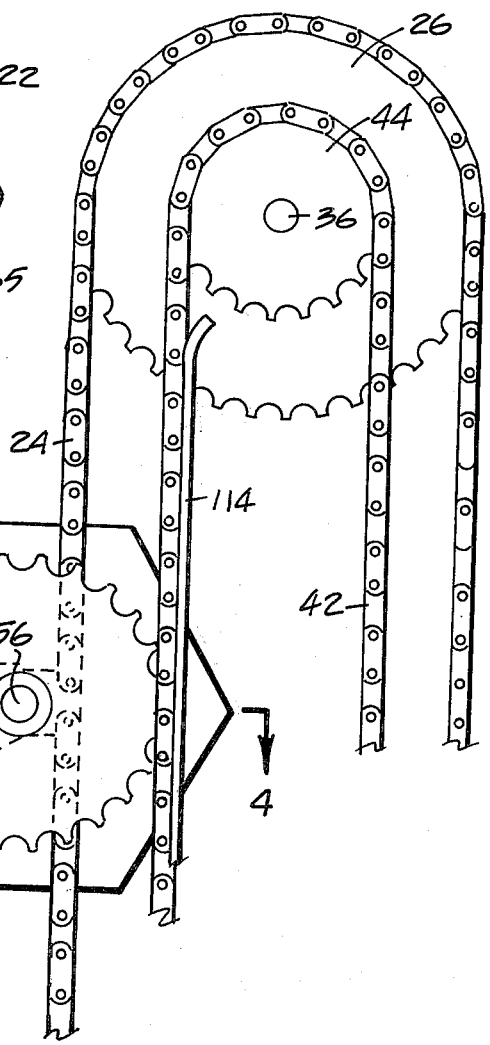

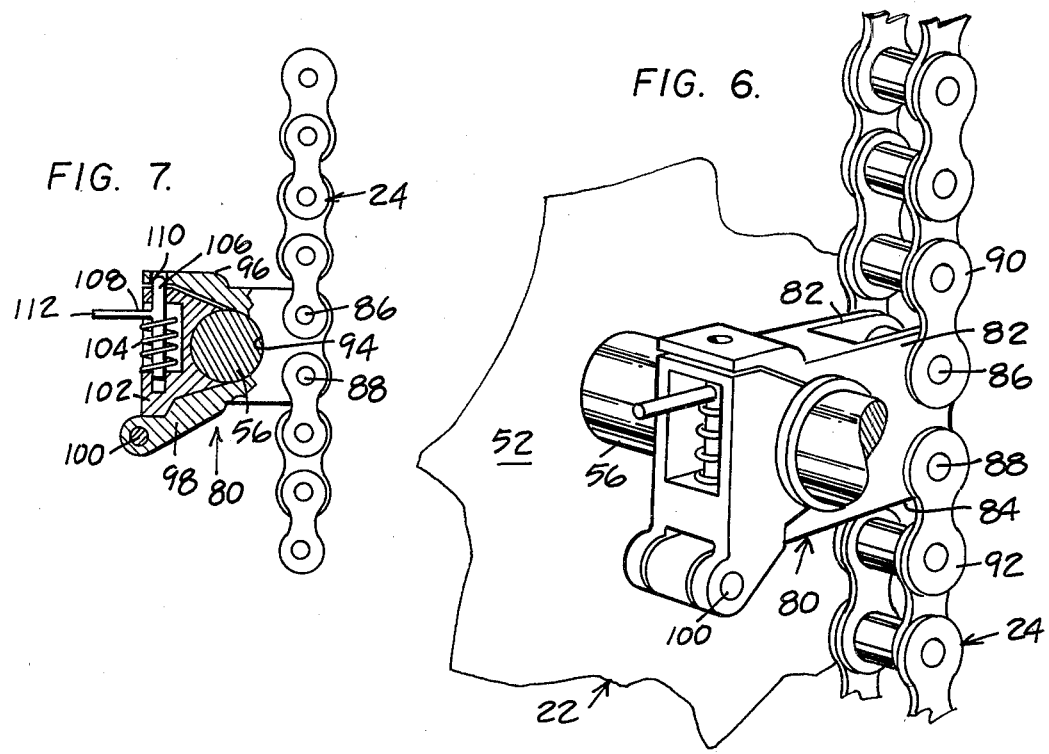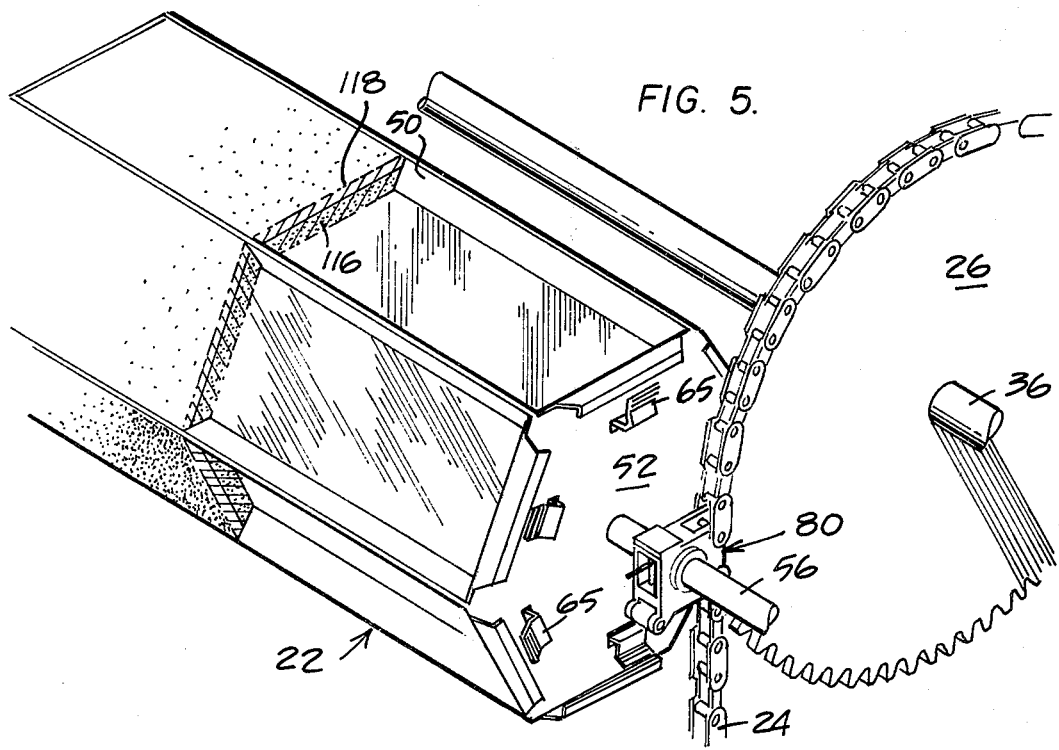

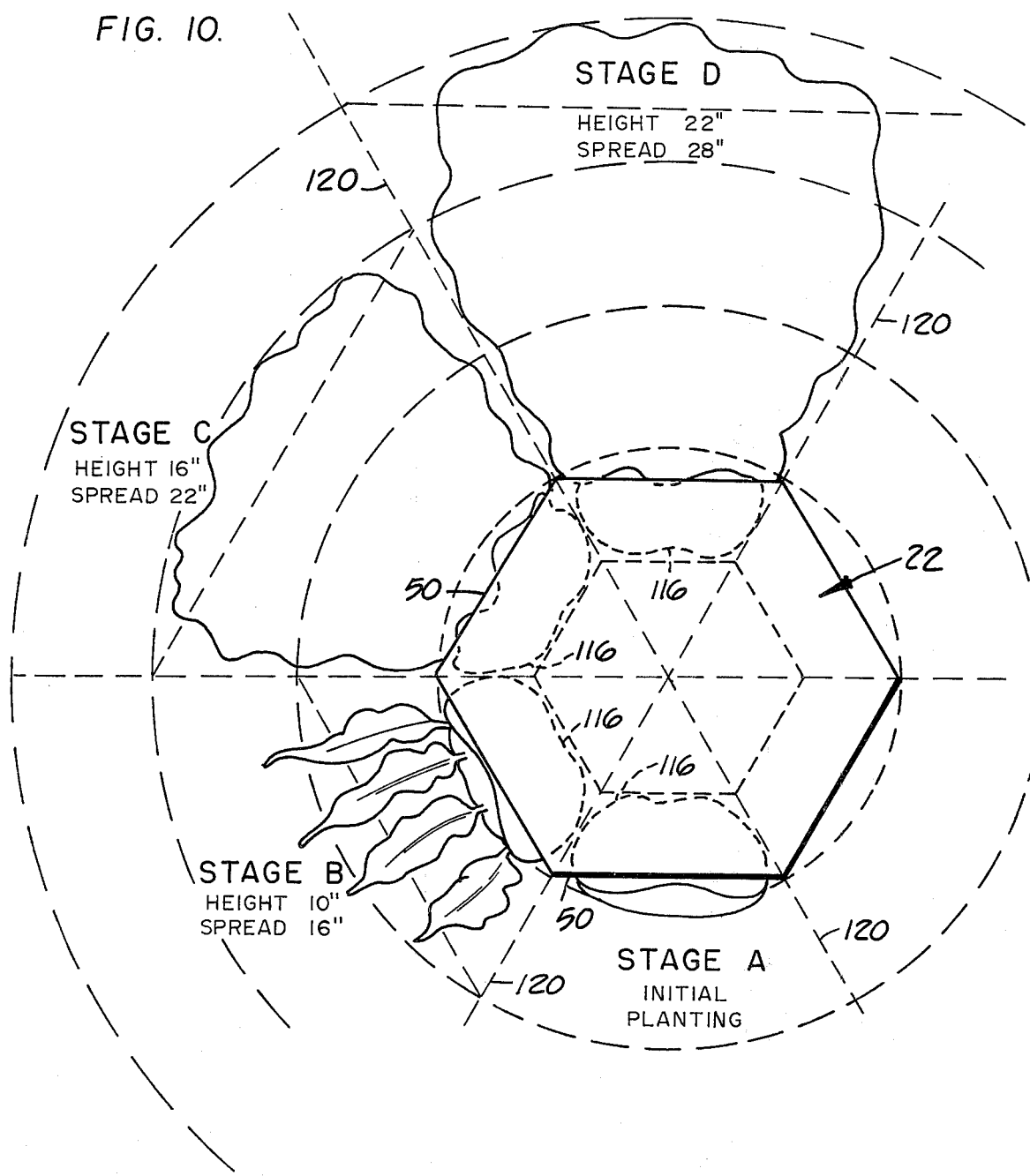

3,909,978

METHOD AND APPARATUS FOR GROWING PLANTS

FIELD OF THE INVENTION

This invention relates to a method for growing or propagating plants in commerce and it also relates to apparatus for carrying out the aforesaid method in a particularly efficient and effective manner.

BACKGROUND OF THE INVENTION

Traditional nurseries and other plant growing facilities heretofore devised have been equipped with standard benches, beds and ground growing areas used in the production of horticultural plants. Such facilities require relatively large areas to accommodate small groups of plants in various stages of growth due primarily to the conventional practice of growing plants on flat surfaces maintained in a generally horizontal position. This traditional approach to plant propagation has resulted in an extreme waste of space which in many instances has made nursery operations inefficient and overly expensive.

Another problem in the growing and propagation of plants in nurseries, greenhouses and the like has been that of providing for all plants the most ideal environment for growth, taking into account the fundamental factors of light, heat and humidity. In conventional nursery facilities it is customary to allow plants to remain stationary in the same location during their entire growing period until harvest or removal. Such plants are subjected to environmental conditions which are not uniform for a group of plants nor ideal as to the quality of conditions.

Yet another problem in the growing of plants in large quantities from seed or cuttings has been that of stimulating plant growth in early stages so as to increase the production of readily transplantable plant products. Basically, this involved a problem of providing not only the proper environmental conditions above ground, but also of providing conditions contributing to maximum root development by delivering to the roots and root initials the required amounts of air, plant food and moisture for producing uniformly excellent plants within a shorter growing time.

Having in mind the aforesaid and other problems involved in the growing and propagation of plants, it is a general object of my invention to provide a method for producing plants and flowers which solves these problems.

Another object of the present invention is to provide an apparatus particularly suitable for carrying out the aforesaid method.

Another more specific object of my invention is to provide an apparatus that will support a relatively large planting area formed by the flat sides of a module structure having a generally elongated configuration with a longitudinal axis of rotation, and an apparatus that will move the module along in one direction while simultaneously rotating it.

Another object of my invention is to provide an apparatus that will accommodate a large number of plants in a relatively small space during the growing period from propagation through point of sale.

Yet another object of the present invention is to provide an apparatus for simultaneously moving and rotating a large number of plants in their growing state, and moreover an apparatus that is easy to operate, to accommodate, is strong, durable and easy to maintain, and which is particularly well adapted for ease and economy of manufacture.

BRIEF SUMMARY OF THE INVENTION

The aforesaid and other objects of the present invention are accomplished by an apparatus adapted for installation in a plant nursery or the like and comprising broadly a series of elongated modules, each supporting a series of trays or the like within which plants are retained in their growing state at various stages of maturity from propagation to mature plant. The trays are arranged on each module at intervals extending the full 360° around the module axis, such as along the six sides of a hexagon. The modules are journaled at their opposite ends in a conveying means used as a linked chain and they are connected by a driving means so that each module can be rotated at a predetermined speed. The conveying means is also driven at a predetermined uniform rate so that the modules may be moved slowly along as they are rotated. As each module turns on its axis, the growing media containing seeds, cuttings or plants is also rotated though not displaced within its planting tray. This rotation causes moisture, air and whatever other free-moving components there may be within the growing material to be tumbled, thereby providing a stimulating action on the plant roots that is highly beneficial to plant growth. As the plant modules on an apparatus are moved linearly by the conveying means they pass through zones which may be conditioned to provide predetermined amounts of heat, light, moisture and fertilizer. This makes it possible for all of the plants of the apparatus to be constantly exposed to uniform, controlled plant growing conditions.

Other objects, advantages and features of my invention will become apparent from the following detailed description of one embodiment thereof, which is presented with the accompanying drawings in accordance with 35 U.S.C. 112.

BRIEF DESCRIPTION OF THE DRAWING

FIG. 3 is a fragmentary view in side elevation of the apparatus of FIGS. 1 and 2;

FIG. 4 is a fragmentary view in section taken along line 4—4 of FIG. 3;

FIG. 5 is a fragmentary view in perspective showing the apparatus of FIGS. 1 – 4 and further details of the module with its supporting link for one drive chain;

FIG. 6 is an enlarged fragmentary view in perspective of the module supporting link of FIG. 5;

FIG. 7 is a fragmentary view in said elevation showing the module supporting link of FIGS. 5 and 6 in partial section;

FIG. 8 is a fragmentary exploded view in perspective showing the one module for my apparatus with one plant carrying tray removed;

FIG. 9 is an enlarged fragmentary view in section showing the retaining latch for a tray within a module; and FIG. 10 is a schematic end view of one module showing how the space requirements of plants can be accommodated at various stages of their growth.

DETAILED DESCRIPTION OF EMBODIMENT

Figure 1:
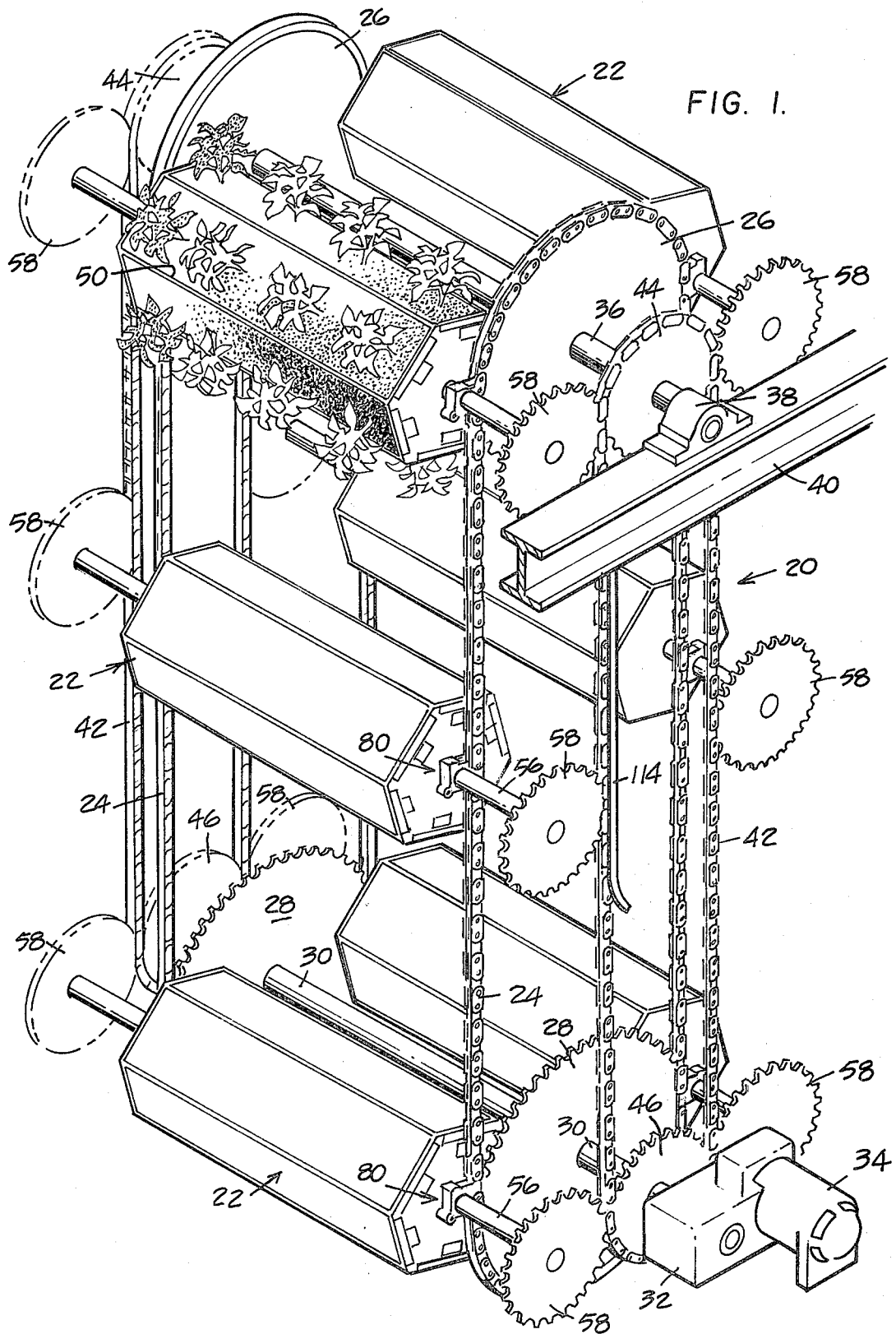
FIG. 1 is a view in perspective of an apparatus embodying principles of the present invention.

Referring to the drawing, FIG. 1 shows an apparatus 20 embodying the principles of the present invention as it would appear when in use in a plant growing nursery or the like. In such a facility heat, light and general atmosphere conditions may be controlled by various well known means, so that environmental conditions are optimum for maximum plant growth.

The apparatus comprises a series of plant holding modules 22 that are supported at their ends in a pair of spaced apart endless chains 24 that form a conveying means. Each of these chains extends around a pair of upper and lower sprocket wheels 26 and 28 that are spaced apart vertically. In the embodiment illustrated the lower sprocket wheels 28 are fixed to a shaft 30 which is connected through a gear box 32 to a drive motor 34. The upper sprocket wheels 26 are fixed to a similar shaft 36 which is journaled in bearing blocks 38 that are mounted on a suitable frame 40. The aforesaid arrangement enables the sprocket wheels 26 and 28 to be driven at a constant speed or rotation, thereby driving the chains 24 and moving the plant holding modules 22 at a constant linear speed.

Figure 2:
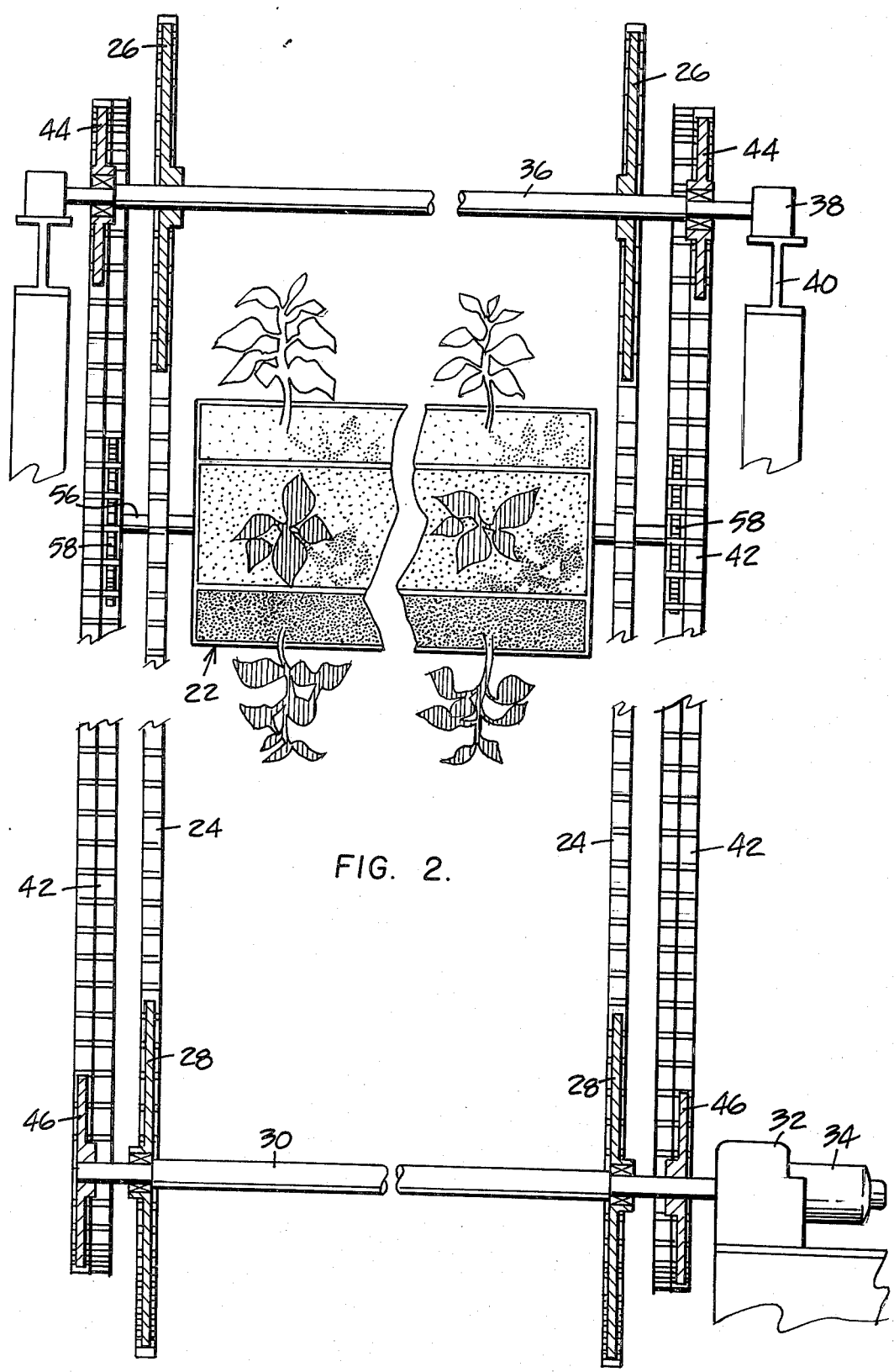
FIG. 2 is a view in front elevation of the apparatus of FIG. 1 with portions broken away.

In addition to the linear movement imparted to the modules by the conveying means the modules are also caused to rotate at a uniform rate as they move along. As shown in the embodiment of FIGS. 1 – 3, this rotational movement is provided by a second pair of endless chains 42. Each of these latter chains extends around a pair of upper and lower sprocket wheels 44 and 46. The upper sprocket wheels 44 are also fixed to the shaft 36 and spaced outwardly from the sprocket wheels 26 while the lower sprocket wheels are fixed to the lower shaft 30 and outwardly from the sprocket wheels 28. The sprocket wheels 44 and 46 are smaller than the wheels 26 and 28 and therefore the chains 24 travel at a faster linear speed than the chains 42. This speed differential is used to rotate the plant modules.

In the form shown, each plant module 22 has a generally hexagonal cross section and provides a supporting device for six planting trays 50. As shown in FIG. 8, hexagonal end members 52 are interconnected by outer longitudinal divider members 54 anchored at the junction of each adjoining pair of hexagonal sides on each end member. A shaft 56 providing the longitudinal axis for each module is fixed in and extends a predetermined distance from the hexagonal end members 52. Fixed to both opposite ends of the shaft 56 are a pair of sprocket wheels 58.

The longitudinal divider members 54 provide a seat for the plant trays 50 which are sized to fit between adjacent pairs of these divider members. As shown in FIG. 8, each plant tray has an open top with parallel end members 60 and sloped side members 62 that are fixed to a bottom member 64. When the plant trays 50 are installed within a module their end members 50 are all adjacent the hexagonal end members 52 of the module while the sloped side members of adjacent trays fit parallel to each other on opposite sides of the inner and outer longitudinal members 54.

Once installed on the module 22 each tray 50 may be held in place by a suitable latching means. For example, as shown in FIG. 9, a pair of spring loaded pivotal latches 65 are mounted in the opposite module end members 50 for retaining each tray. Each latch is normally urged at its spring 66 to cause a bent locking portion 68 to project through an opening 70 in the module end member and into a recess 72 provided in the end member 60 of each plant tray. This secures the tray in position on the module. To release each tray from its module a latch handle portion 74 is merely pushed inwardly to pivot the latch about a pin 76 against the spring force. This latch release may be accomplished easily by gripping a pair of handle portions 78 on each tray that extend outwardly from each of their end members 60 over the edges of the adjacent module end member.

As shown in FIGS. 5 – 7, the shaft 56 of each module 22 is mounted at its ends between each end member 52 and the sprocket 58 in a two-piece bearing 80 which forms a link in the chain 24. The axis of the shaft for each of these bearings is offset from the alignment of the links of the chain in order to eliminate any interference with the chain in its normal operation. Thus, each bearing has a pair of parallel, spaced apart projections 82 that extend from a first, stationary member 84 of the bearing. These projections are provided with upper and lower pairs of aligned holes, so that they can be connected by suitable pins 86 and 88 to adjacent links 90 and 92 of the chain 24, as best shown in FIGS. 6 and 7. The first bearing member has a curved inner bearing surface 94 and upper and lower integral portions 96 and 98 which extend outwardly from this surface. The lower integral portion 98 provides a journal for a pin 100 and supports a pivotally connected second or movable member 102 of the bearing 80 having a curved inner bearing surface 104 that is complementary to the surface 94. Mounted within the movable bearing member is a movable retaining pin 106 connected to a coil spring 108. When the second bearing member 102 is in its normal operating position, complementary to the first bearing member 84, the pin 106 is kept within a recess 110 in the upper portion 96 of the movable bearing member. A handle 112 on the pin 106 enables the latter to be easily retracted against the force of the spring 106 whenever it is necessary to separate the bearing members 84 and 102 to remove a module 22.

As previously described, with reference to FIG. 1, shaft 30 extending through the sprocket wheels 28 and 46 is connected to the power drive 32. The chains 42 around the sprockets 44 and 46 are of a double link type. The drive and supporting sprockets 44 and 46 engage one set of links and the sprockets 58 for the module shafts 56 engages the other set of links on the same chain.

Thus, it is seen that driving power is supplied directly from the motor 34 to turn the sprocket wheels 28 and thereby move the chains 24 at a uniform linear rate of travel. This also moves the plant modules 22. Now, since the sprocket wheels 58 for the modules are also engaged with the chains 42 the modules are caused to rotate within their bearings 80 as they are also moved along. The result is a combined linear and rotational movement of the plant module and hence of the plant material which it supports. In order to prevent any excess movement of the chains 42 and assure a continuous engagement of the module sprockets 58 with it, a pair of retaining rails 114 are fixed to the apparatus frame 40. Each rail extends downwardly adjacent to a chain 42 and provides a backup surface to hold it in place as the module sprockets move along it.

The plant trays 50 can be used in the conventional manner to form bedding containers for plants and plant materials. The growing media 116 used in the trays may be a solid natural or synthetic material as Br-8, Kys-Kubes, Jiffy-7 or the like. When soil or any other loose soil-like mix is used, as shown in FIG. 5, a layer of retaining material 118 such as sheet of foamed plastic or thin wire mesh may be used on top of the soil to hold it in place as the modules are rotated and moved along by the apparatus.

The apparatus 20 can be made in various sizes and could therefore accommodate large or small numbers of plant modules 22. Thus, in a plant nursery or growing facility the space available can be utilized most efficiently. In such space the environmental conditions for optimum plant growth can be maintained. If desired, the apparatus can be used in conjunction with watering or fertilizing stations which the modules will pass through at periodic intervals.

As the plants in the trays 50 grow, their foliage will extend radially from the plant module, and not interfere with plants of adjacent trays. The spacing of the modules may be sufficient to allow a considerable plant growth before removal and when necessary the modules may be spaced further by moving them to different bearing links of the drive chains as the plant growth enlarges.

The important space saving feature afforded by the multi-sided modules 22 is illustrated schematically in FIG. 10. Here is shown an end view of a typical module having a hexagonal shape which, according to my invention, is caused to move linearly as well as rotate when installed in the apparatus 20. As shown by the dotted diametral lines 120 drawn through the module axis and spaced 60° apart the area above each tray expands radially. Although in actual use each module would normally contain plants of the same age and state of growth, and thus substantially the same size, FIG. 10 shows four of the six module trays with plants at different stages of growth. This illustrates how the new plant growth is automatically accommodated as the plants grow progressively larger. Thus, at the lowermost tray, designed as stage A, assume that small cuttings such as chrysanthemums are placed therein in a block of growth media with normal lateral spacing. At stage B, shown in the adjoining tray, the plants have grown to an average height of 10 inches (including container) with a spread of about 16 inches available. At this point the plants are commencing to enlarge their root systems and top growth is sufficient to permit pinching. At the next stage C, the plants have grown to a height of around 16 inches with a spread of around 22 inches and at the following stage D, the plant height has attained 22 inches with a spread of 28 inches. From this example, it may be readily seen that the accommodation of plants in a multi-sided or multi-surfaced module, as shown, allows them to grow to a considerable height and spread in a relative small amount of space. Moreover, within this space the environmental conditions of light, heat and moisture can be carefully controlled to achieve optimum growing results. Also, the plants while moving and rotating on the apparatus 20 can be always readily accessible for any treatment or maintenance that is required of them.

As the module turns, a highly beneficial action occurs within the soil media which serves to stimulate the growth and development of the plant roots. Instead of the moisture gravitating to one portion of the growing media within the tray as in stationary containers it is continually tumbled within the soil media 16 of the tray due to module rotation. This helps to circulate the minerals and plant food within the soil media, making it more uniformly accessible to the plant roots.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An apparatus for holding horticultural plants while stimulating their growth comprising:
   frame means;
   a plurality of plant modules, each said module supporting at least one tray means for a multiplicity of plants, seedlings, cuttings, bulbs, flowers or other materials;
   moving means on said frame means for carrying said plant modules along a continuous substantially vertical path; and
   means engaging said moving means and said plant modules for rotating said plant modules and its tray means about a horizontal axis as they are being moved along said path whereby moisture and soil nutrients are prevented from gravitating to only one portion of each said tray means of said plant modules.

2. The apparatus as described in claim 1 wherein said plant module is generally elongated and said tray means on each said module comprises a plurality of open containers supported on said plant module in different planes, all of which are substantially parallel to said axis of rotation.

3. The apparatus as described in claim 1 wherein said plant module has a multi-surfaced shape in a cross section perpendicular to said axis of rotation.

4. The apparatus as described in claim 1 wherein said plant module has multi-sided end members that are parallel and are connected together by longitudinal members, said tray means comprising elongated open containers that fit between said longitudinal members.

5. The apparatus as described in claim 1 including releasable latch means for retaining said tray means on said module when it is moving and for releasing it from said module when the tray means requires removal therefrom.

6. The apparatus as described in claim 5 wherein said latch means includes a pivotable member mounted on said module and normally urged by spring means against said tray means.

7. The apparatus as described in claim 1 wherein said module has parallel and spaced apart end members, shaft members fixed to and projecting from said end members along said axis of rotation, and sprocket wheel means fixed to the ends of said shaft means.

8. The apparatus as described in claim 1 wherein said means for moving said modules in a linear path comprises a first endless chain means, means for driving said first chain means at a constant preselected rate, and means on said first chain means for rotatively supporting a plurality of said modules at spaced apart locations thereon.

9. The apparatus as described in claim 8 wherein said means for rotating said plant modules comprises a second chain means, and sprocket means connected to each said module, said sprocket means being engaged with said second chain means and thereby rotating said module as it is moved along by said first chain means.

10. The apparatus as described in claim 9 including an elongated stabilizer means adjacent to said second chain means for preventing excessive deflection of it as said module moves along.

11. A method for growing plants in a confined space having a controlled enviroment, said method comprising the steps of:
placing plant material in trays of root growing media;
securing said trays to an elongated module having a horizontal axis of rotation so that they are parallel to and spaced radially from said axis;
rotating said module about said horizontal axis while simultaneously moving it along a continuous substantially vertical path through said controlled environment whereby moisture and soil nutrients are prevented from gravitating to only one portion of each said tray means of said plant modules.

12. The method as described in claim 11 wherein said continuous path of said modules is substantially vertical in alternatively ascending and descending directions.

13. The method as described in claim 11 providing variable conditions of controlled environment along the continuous path of said modules.

14. The method as described in claim 11 wherein said trays on said module are arranged in different planes, all of which are parallel to the horizontal axis of the module.

* * * * *